(12) United States Patent
Roberts et al.

(10) Patent No.: US 7,306,235 B2
(45) Date of Patent: Dec. 11, 2007

(54) GASKET ASSEMBLY HAVING ISOLATED COMPRESSION LIMITING DEVICE

(75) Inventors: Brian Roberts, Carpentersville, IL (US); Gary Bold, Chicago, IL (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 73 days.

(21) Appl. No.: 11/193,810

(22) Filed: Jul. 29, 2005

(65) Prior Publication Data

US 2007/0024010 A1 Feb. 1, 2007

(51) Int. Cl.
*F02F 11/00* (2006.01)
(52) U.S. Cl. ............ 277/593; 277/596; 277/598
(58) Field of Classification Search ........... 277/593, 277/596, 598
See application file for complete search history.

(56) References Cited

U.S. PATENT DOCUMENTS

| | | | |
|---|---|---|---|
| 2,739,001 A | 3/1956 | Chiles, Jr. | |
| 2,790,660 A | 4/1957 | Jones | |
| 3,352,564 A * | 11/1967 | Johnson | 277/593 |
| 3,531,133 A * | 9/1970 | Gulick et al. | 277/611 |
| 4,101,138 A * | 7/1978 | Gaggiano | 277/598 |
| 4,535,996 A | 8/1985 | Cardis | |
| 4,535,999 A * | 8/1985 | Locacius | 277/596 |
| 4,655,463 A | 4/1987 | Inciong | |
| 4,730,836 A * | 3/1988 | Miller et al. | 277/598 |
| 4,867,461 A * | 9/1989 | Shimmell | 277/593 |
| 5,054,793 A | 10/1991 | Hauenstein | |
| 5,145,190 A * | 9/1992 | Boardman | 277/596 |
| 5,267,740 A * | 12/1993 | Stritzke | 277/596 |
| 5,492,343 A | 2/1996 | Smith | |
| 5,671,927 A * | 9/1997 | Schweiger | 277/630 |
| 5,700,017 A * | 12/1997 | Tensor | 277/596 |
| 5,803,465 A * | 9/1998 | Schweiger | 277/593 |
| 6,039,323 A | 3/2000 | Mockenhaupt | |
| 6,062,573 A * | 5/2000 | Budovec et al. | 277/598 |
| 6,318,731 B1 | 11/2001 | Belter | |
| 6,371,489 B1 * | 4/2002 | Combet et al. | 277/594 |
| 6,435,517 B1 | 8/2002 | Belter | |
| 6,609,717 B2 * | 8/2003 | Hinson | 277/598 |
| 7,048,279 B2 * | 5/2006 | Gernand et al. | 277/596 |

FOREIGN PATENT DOCUMENTS

EP 0148484 * 7/1985

* cited by examiner

*Primary Examiner*—Alison K Pickard
(74) *Attorney, Agent, or Firm*—Robert L. Stearns; Dickinson Wright PLLC

(57) ABSTRACT

A manifold gasket includes a carrier frame with a plurality of media-conveying openings corresponding to openings communicating between two parts to be clamped, such as an intake manifold and a cylinder head. Elastomeric sealing material is molded to the carrier frame about the openings to seal the openings when clamped. A compression limiting device is disposed on the carrier frame and is isolated from direct contact with the carrier frame by intervening elastomeric bonding material to limit compression of said elastomeric sealing material when the gasket is clamped between the head and block. The elastomeric bonding material renders the compression limiting device free-floating relative to the carrier frame.

2 Claims, 3 Drawing Sheets

GASKET ASSEMBLY HAVING ISOLATED COMPRESSION LIMITING DEVICE

BACKGROUND OF THE INVENTION

1. Technical Field

This invention relates generally to static gasket assemblies of the type used to form a seal at a joint where two members are clamped together and more particularly to such gaskets having features to limit the compression of the elastic seal elements.

2. Related Art

It is common in many applications to provide a static gasket to seal the joint between two members that are clamped together in order to provide a fluid-tight seal to media conveyed through openings between the members and through the gasket. It is common for such gaskets to have some type of rigid carrier frame onto which beads of rubber or other elastomeric materials are molded to provide an effective seal under compression.

In one known gasket assembly, the carrier frame is fabricated of plastic and has a thickness, particularly in the regions of the sealing beads, that is effective to limit the amount by which the elastomeric sealing beads can be compressed. At maximum compression, the mating surfaces of the clamped members confront corresponding stop surfaces on the plastic carrier frame thereby precluding further compression of the elastic sealing beads. While this arrangement is effective at controlling the compression of the elastic sealing beads, it requires that the plastic carrier body be sufficiently thick and strong so as to withstand the clamping loads without breaking.

SUMMARY OF THE INVENTION AND ADVANTAGES

A gasket assembly for an internal combustion engine includes a carrier frame having a plurality of media-conveying openings. Elastomeric sealing material is molded on the carrier frame in surrounding relation to at least some of the openings and project outwardly of the carrier frame so as to be elastically deformable when the gasket assembly is compressed to provide a seal about the intake openings. A compression limiting device is disposed on the carrier frame and isolated from direct contact with said carrier frame by intervening elastomeric bonding material to limit compression of said elastomeric sealing material when said gasket is clamped between the head and block.

The elastomeric bonding material is advantageous in that it renders the compression limiting device free-floating relative to the carrier frame. Such a free-floating limiter promotes even distribution of the sealing elements while still limiting the amount by which the sealing elements can be compressed.

Use of the isolated compression limiting device has the further advantage of relieving the carrier frame itself from also serving as a compression limiter. This, in turn, increases the available sealing area for the sealing material, thereby enhancing the sealing effectiveness of the gasket.

The compression limiting device may further include a locator pin projecting from a compression limiting surface of the compression limiting device. The locator pin has the advantage of helping locate the gasket in proper alignment during installation and use of the gasket.

THE DRAWINGS

These and other features and advantages of the present invention will become more readily appreciated when considered in connection with the following detailed description and appended drawings, wherein.

DETAILED DESCRIPTION

Figure 1:
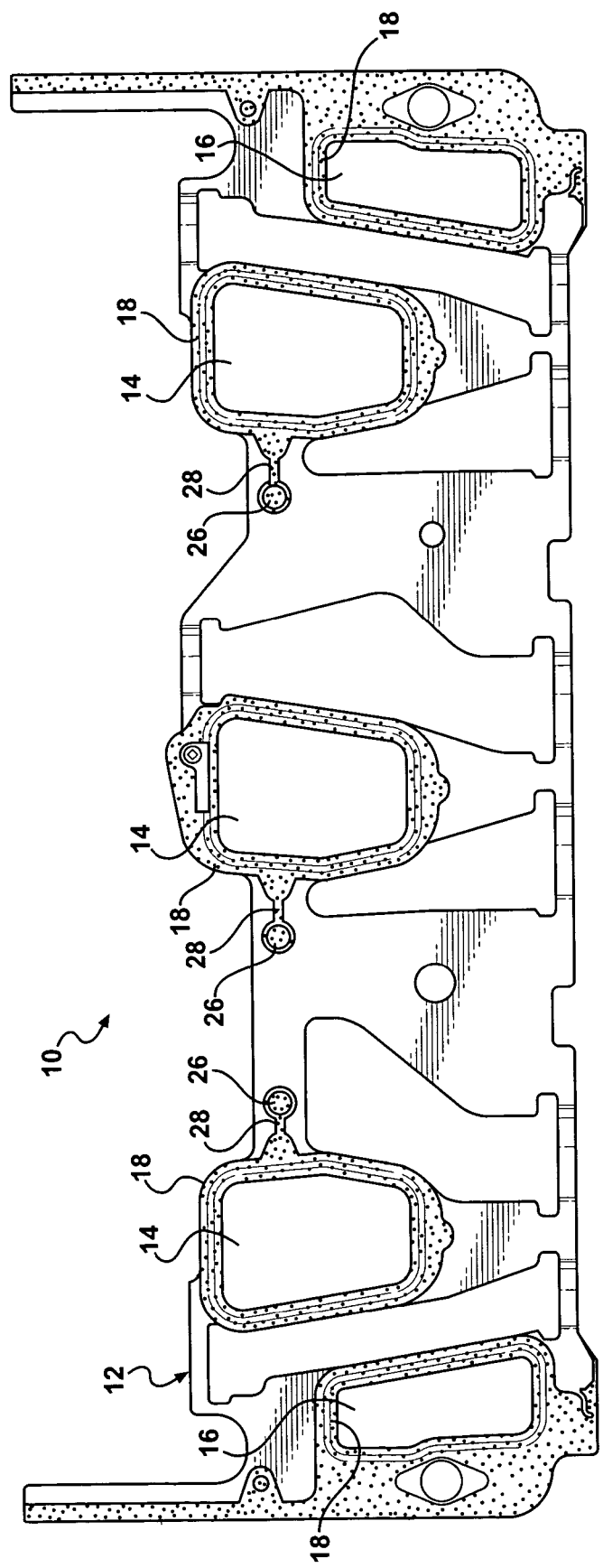
FIG. 1 is a perspective view of a gasket assembly constructed according to a presently preferred embodiment of the invention.
Figure 4:
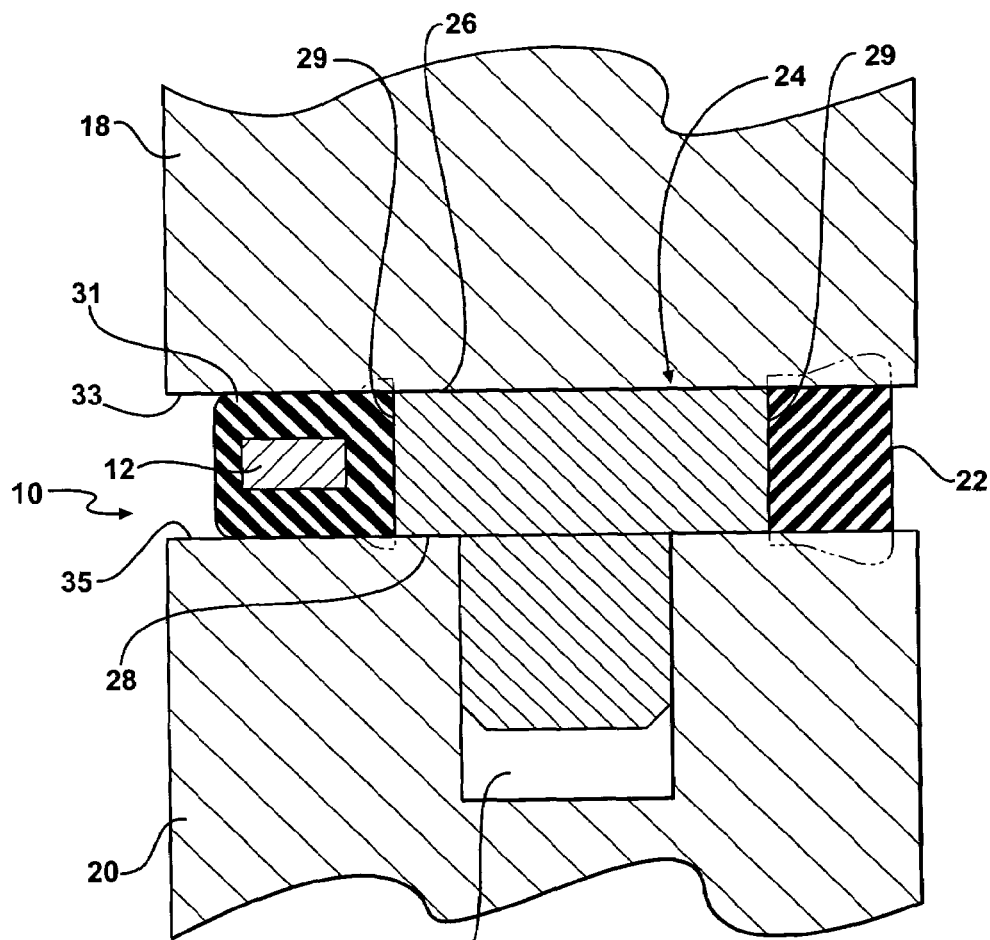
FIG. 4 is a view like FIG. 3, but showing the gasket installed in use under compression.

A gasket assembly constructed according to an embodiment of the invention is shown generally at 10 in FIG. 1 and includes a carrier body or frame 12 providing a rigid framework of the gasket assembly 10. The frame 12 may be fabricated from any suitable material, such as aluminized steel or the like. The assembly 10 is formed with a plurality of media-conveying openings. The illustrated example shows an intake manifold gasket 10 having a plurality of air intake openings 14 and engine coolant openings 16. The gasket 10 is used for sealing the joint between an intake manifold 18 and a cylinder head 20 (FIG. 4). The openings 14, 16 correspond with associated openings in the intake manifold 18 and cylinder block 20 to enable flowable media, such as air and engine coolant, to be conveyed between the intake manifold 18 and cylinder head 20 through the openings 14, 16 respectively in the gasket assembly 10.

Beads of elastomeric sealing material 22 (such as rubber or the like) are molded to the carrier body 12 about each of the respective media-conveying openings 14, 16 in order to provide a fluid-tight seal about the openings when the manifold 18 is bolted to the cylinder head 20. The sealing beads 22 project from the carrier body 12 on opposite sides thereof, such that the sealing beads 22 are elastically compressed when clamped between the intake manifold 18 and cylinder head 20 (compare FIGS. 3 and 4).

Figure 2:
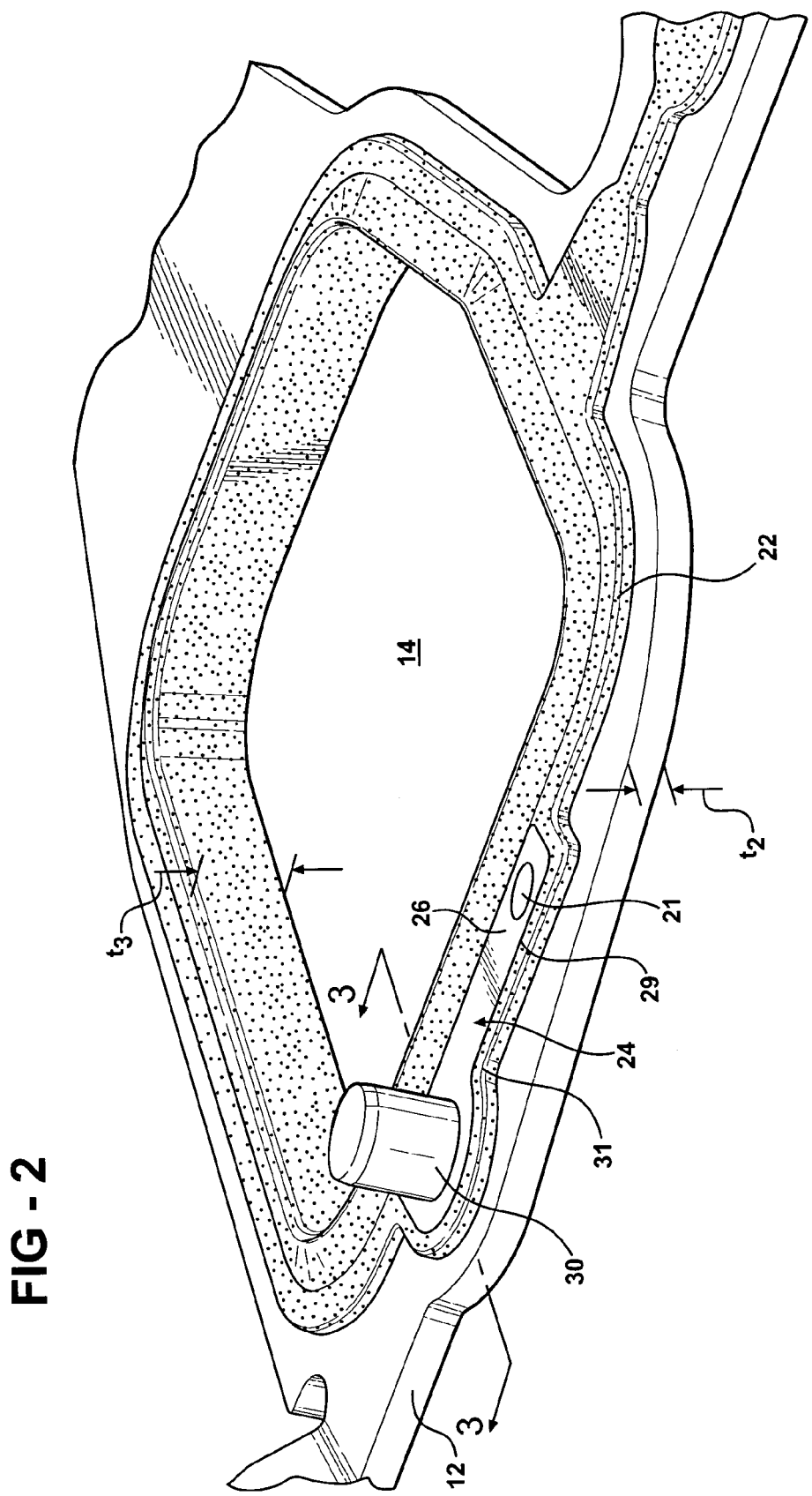
FIG. 2 is an enlarged fragmentary perspective view of a portion of FIG. 1.
Figure 3:
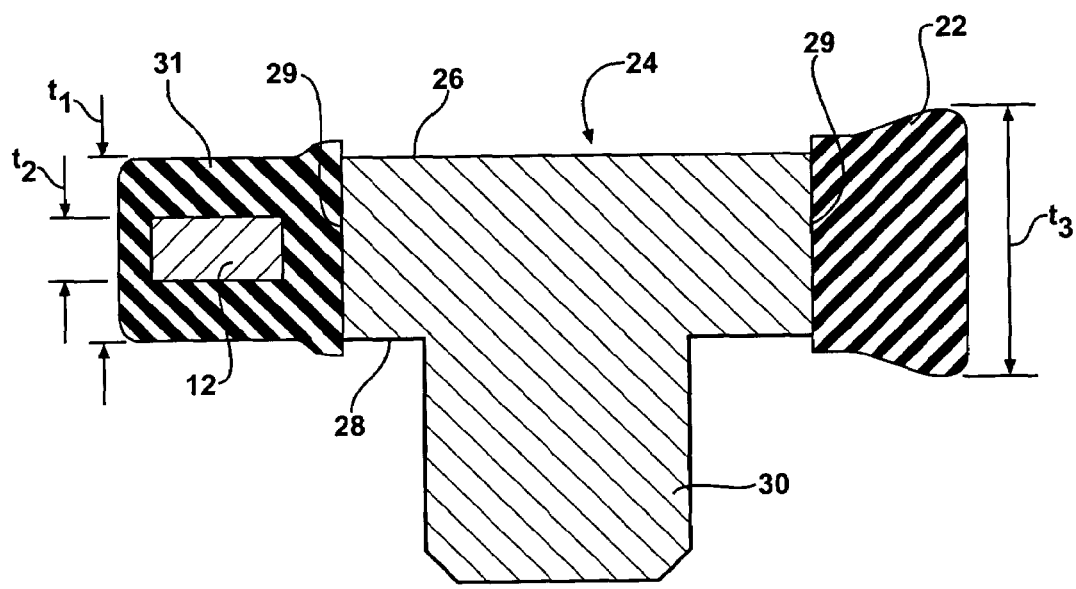
FIG. 3 is an enlarged cross-sectional view taken along lines 3-3 of FIG. 2.

A load or compression limiting device 24 is disposed on the carrier body 12 adjacent at least one of the openings 14, 16. The device 24 has opposite compression limiting surfaces 26, 28 which define a thickness $t_1$ of the limiting device 24 that is greater than the thickness $t_2$ of the carrier body 12 in the area immediately surrounding the openings 14, 16, but being lesser in thickness than the maximum thickness $t_3$ of the sealing beads 22 when in an uncompressed condition (FIGS. 2 and 3). By "effective thickness", it is meant to account for any intervening carrier material than may be present when measuring the sealing beads through the thickness of the gasket assembly 10 from peak to peak. The compression limiting device includes an outer peripheral side surface 29 which is spaced from direct contact with the carrier frame 12. The compression limiting device 24 is formed as a separate piece from the carrier frame 12 and is mounted on the carrier frame 12 by a band of intervening elastomeric bonding material 31. This material 31 surrounds the device 24 about its peripheral side surface 29 and in doing so isolates the device 24 from direct contact with the carrier frame 12. This allows the device 24 to float relative to the carrier to the extent allowed for by the material 31. As such, misalignment that may occur between the clamping surfaces can be accommodated by the device by tilting or moving as necessary relative to the carrier frame 12 to achieve the compression limiting function in order to maximize the sealing effectiveness of the beads 22. The device 24 may be fabricated of a suitable metal, such as stainless steel or the like, but the invention is not limited by the selection of materials.

The compression limiting device 24 further includes a locator pin portion 30 that projects outwardly from one of the compression limiting surfaces 26, 28 for receipt in a locating hole 32 of one of the clamping surfaces of either the intake manifold 18 or cylinder block 20. FIG. 4 illustrates the gasket assembly 10 in the fully clamped position, where it can be seen that the locator pin 30 is received in a locating opening 32 of the cylinder head 20 and where the intake manifold 18 and cylinder head 20 are clamped together sufficiently to compress the sealing beads 22 to the point where the clamping faces 33, 35 of the intake manifold and cylinder head 18, 20 confront the compression limiting surfaces 26, 28 of the compression limiting device, thereby precluding further compression of the sealing beads 22. The compression limiting device 24 may include a hole 21 adjacent the locator pin 30 for accommodating a bolt (not shown) used for clamping the manifold 18 to the head 20.

The compression limiting device may be located adjacent a central one of the media conveying openings 14 approximately midway between the longitudinal ends of the carrier body 12. As illustrated in FIG. 1, there may be three such air intake openings 14 in linear succession and a single limiting device 24 associated with the middle one of the three openings 14. It will be seen that additional compression limiting devices 34 may be provided at the opposite ends of the carrier body 12, but they do not include the locater pin feature as does the device 24.

By locating the compression limiting device 24 at the critical area where the head 20 and manifold 18 come together at a machined pad (i.e., the center of the gasket) the device 24 effectively precludes overcompression of the gasket in the central regions and frees up space on the carrier body 12 around the openings 14, 16 in order to increase the available sealing area for the sealing beads 22, thereby increasing the sealing effectiveness of the gasket assembly 10.

Obviously, many modifications and variations of the present invention are possible in light of the above teachings. It is, therefore, to be understood that within the scope of the appended claims, the invention may be practiced otherwise than as specifically described.

What is claimed is:

1. An air intake manifold gasket assembly for an internal combustion engine, comprising:

a carrier frame have a plurality of air intake openings corresponding to associated air ports of an intake manifold and a cylinder block;

an elastomeric sealing material molded to said carrier frame about said air intake openings in said carrier frame, said elastomeric sealing material forming inner peripheral openings about said air intake ports and having outwardly extending elastically compressible sealing beads to form an air tight seal about said air ports between the intake manifold and the cylinder block; and at least one compression limiting device formed separately from said carrier frame, said at least one compression limiting device being molded to said carrier frame between at least one of said inner peripheral openings and said carrier frame, wherein said compression limiting device has opposite compression limiting surfaces for engaging the intake manifold and the cylinder block and further comprising a locator pin extending outwardly from one of said compression limiting surfaces.

2. The air intake manifold gasket assembly of claim 1 further comprising a bolt hole extending through said opposite compression limiting surfaces for receipt of a bolt to fasten the intake manifold to the cylinder block.

* * * * *

(12) INTER PARTES REEXAMINATION CERTIFICATE (0402nd)

United States Patent
Roberts et al.

(10) Number: US 7,306,235 C1
(45) Certificate Issued: Jul. 3, 2012

(54) GASKET ASSEMBLY HAVING ISOLATED COMPRESSION LIMITING DEVICE

(75) Inventors: Brian Roberts, Carpentersville, IL (US); Gary Bold, Chicago, IL (US)

(73) Assignee: Citibank, N.A., New York, NY (US)

Reexamination Request:
No. 95/000,429, Jan. 23, 2009

Reexamination Certificate for:
Patent No.: 7,306,235
Issued: Dec. 11, 2007
Appl. No.: 11/193,810
Filed: Jul. 29, 2005

(51) Int. Cl.
*F02F 11/00* (2006.01)

(52) U.S. Cl. .......................... 277/593; 277/596; 277/598
(58) Field of Classification Search .................. 277/593
See application file for complete search history.

(56) References Cited

To view the complete listing of prior art documents cited during the proceeding for Reexamination Control Number 95/000,429, please refer to the USPTO's public Patent Application Information Retrieval (PAIR) system under the Display References tab.

*Primary Examiner* — Robert M. Fetsuga

(57) ABSTRACT

A manifold gasket includes a carrier frame with a plurality of media-conveying openings corresponding to openings communicating between two parts to be clamped, such as an intake manifold and a cylinder head. Elastomeric sealing material is molded to the carrier frame about the openings to seal the openings when clamped. A compression limiting device is disposed on the carrier frame and is isolated from direct contact with the carrier frame by intervening elastomeric bonding material to limit compression of said elastomeric sealing material when the gasket is clamped between the head and block. The elastomeric bonding material renders the compression limiting device free-floating relative to the carrier frame.

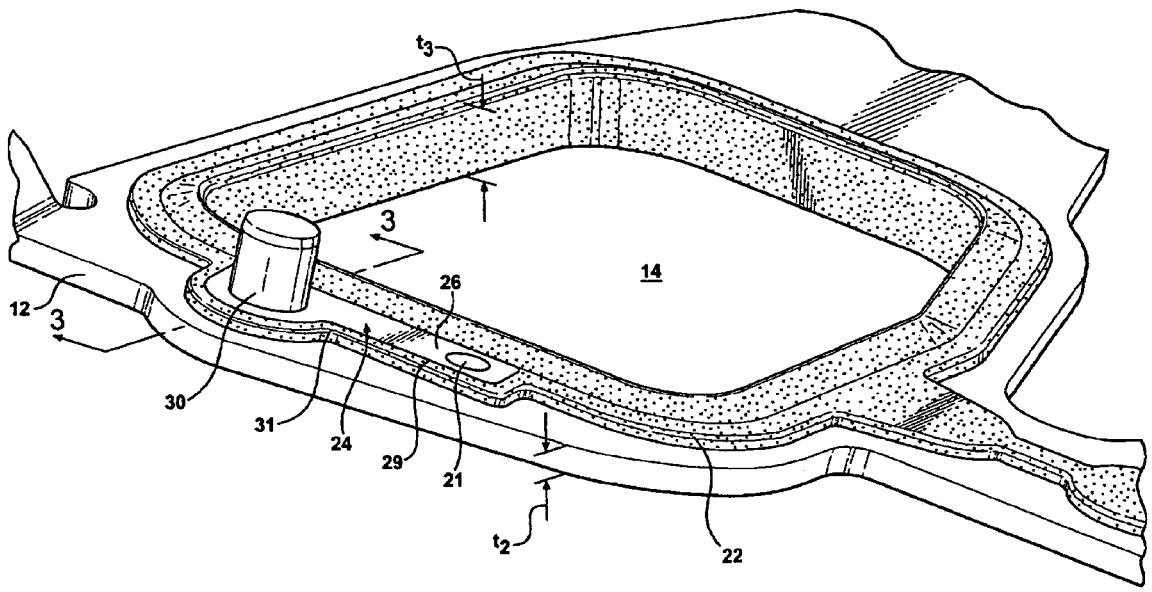

INTER PARTES REEXAMINATION CERTIFICATE ISSUED UNDER 35 U.S.C. 316

NO AMENDMENTS HAVE BEEN MADE TO THE PATENT

AS A RESULT OF REEXAMINATION, IT HAS BEEN DETERMINED THAT:

The patentability of claims 1 and 2 is confirmed.

* * * * *